United States Patent [19]

Dailey

[11] Patent Number: 4,832,901
[45] Date of Patent: May 23, 1989

[54] NUCLEAR REACTOR FUEL ASSEMBLY MIXING VANE REPAIR METHOD

[75] Inventor: George F. Dailey, Plum Borough, Pa.

[73] Assignee: Westinghouse Electric Corp., Pittsburgh, Pa.

[21] Appl. No.: 146,674

[22] Filed: Jan. 21, 1988

Related U.S. Application Data

[62] Division of Ser. No. 859,549, May 5, 1986, Pat. No. 4,736,613.

[51] Int. Cl.[4] .............................................. G21C 19/00
[52] U.S. Cl. .................................... 376/261; 376/439
[58] Field of Search ............... 376/260, 261, 439, 446, 376/463; 72/393, 479; 29/400 N, 402.19, 723

[56] References Cited

U.S. PATENT DOCUMENTS

| | | |
|---|---|---|
| 559,932 | 5/1896 | Clark . |
| 1,445,581 | 2/1923 | Fullop . |
| 2,142,017 | 12/1938 | Riemenschneider et al. . |
| 3,152,830 | 10/1964 | Pounder et al. ........................ 376/264 |
| 3,379,618 | 4/1968 | Frisch . |
| 3,719,560 | 3/1973 | Mayers et al. . |
| 4,229,259 | 10/1980 | Vaill et al. ............................. 376/260 |
| 4,244,616 | 1/1981 | Buchalet . |
| 4,246,783 | 1/1981 | Steven et al. ......................... 376/245 |
| 4,418,770 | 12/1983 | Lambot ................................... 175/58 |
| 4,427,622 | 1/1984 | Knecht et al. ........................ 376/260 |
| 4,652,421 | 3/1987 | Widener ................................ 376/260 |
| 4,655,991 | 4/1987 | Walker .................................. 376/260 |
| 4,668,466 | 5/1987 | Rylatt .................................... 376/245 |
| 4,688,416 | 8/1987 | Shallenberger et al. ........... 376/261 |
| 4,736,613 | 4/1988 | Dailey ................................... 376/260 |

Primary Examiner—Deborah L. Kyle
Assistant Examiner—Daniel Wasil

[57] ABSTRACT

A method for reparing bent mixing vanes in a nuclear reactor fuel assembly is described, including the steps of introducing an apparatus having movable blades below a grid with a mixing vane; opening the blades; withdrawing the apparatus so that a blade abuts and straightens the bent mixing vane; closing the blades; and fully extracting the apparatus from the fuel cell.

13 Claims, 7 Drawing Sheets

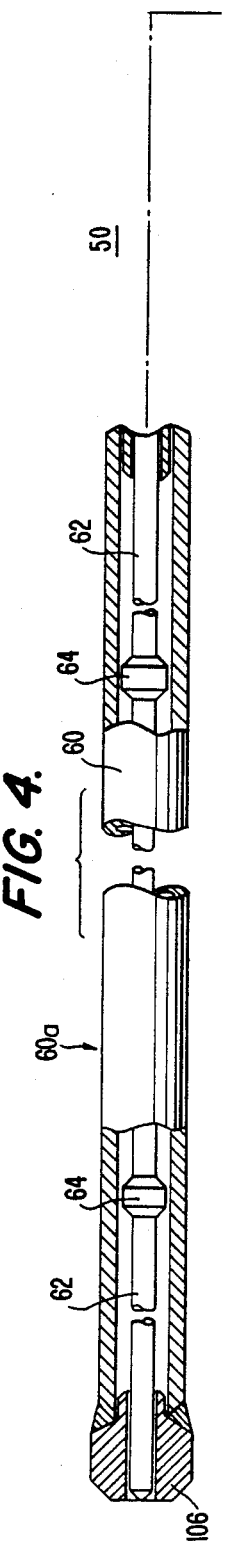
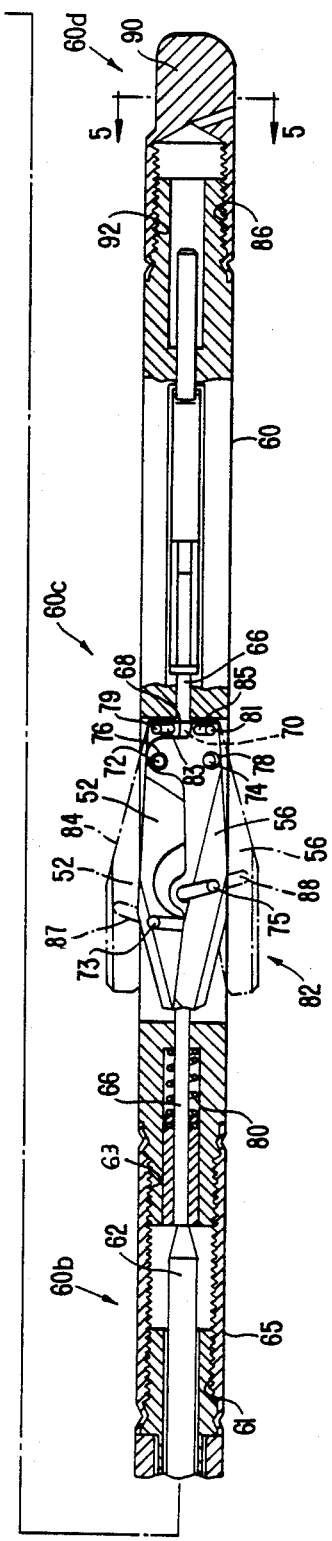
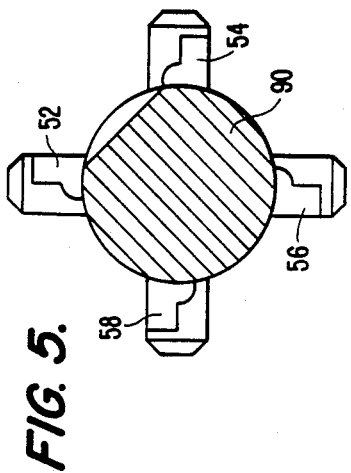
FIG. 4.
FIG. 5.

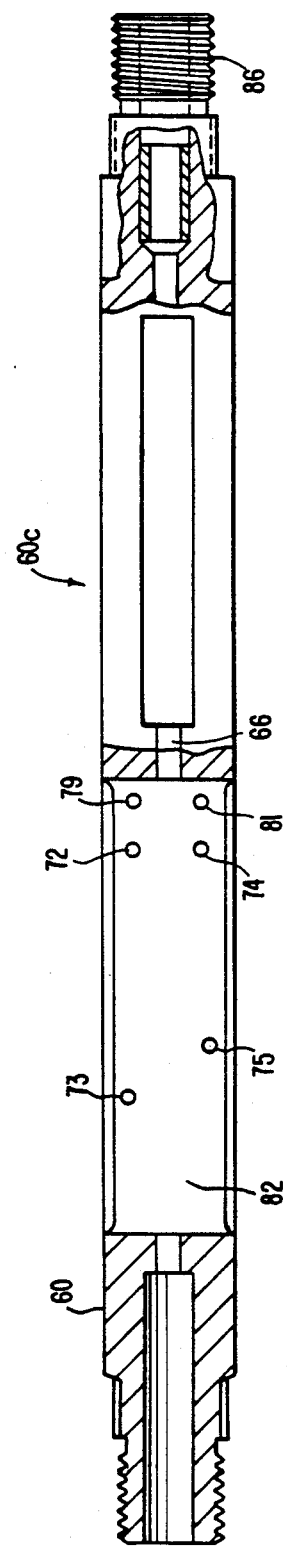

NUCLEAR REACTOR FUEL ASSEMBLY MIXING VANE REPAIR METHOD

This is a division application Ser. No. 06/859,549, filed May 5, 1986, now U.S. Pat. No. 4,736,613.

BACKGROUND OF THE INVENTION

This invention relates to nuclear reactors and, more particularly, to a method for repairing bent mixing vanes found in the fuel assemblies of nuclear, pressurized-water reactors.

As described in co-assigned U.S. Pat. No. 3,719,560 issued to MAYERS et al., located within a conventional nuclear, pressurized-water reactor is a plurality of parallel fuel rod supporting grids. These grids are made up of a plurality of thin bands or straps arranged in a lattice configuration to form individual fuel cells. Each fuel rod containing nuclear fuel pellets is inserted through a fuel cell within a grid. Each fuel rod is held in a fixed relationship within the fuel cell by a plurality of springs (see, e.g., co-assigned U.S. Pat. No. 3,379,618 issued to FRISCH), and punched, metal dimples arranged along the inner faces of each fuel cell. Each fuel rod is supported by being lightly pushed against the dimples via one or more of the springs.

The grids also include metal fins or "mixing vanes" at the corners thereof, perpendicular to the grid straps, which may lightly abut, but do not mechanically support, the fuel rod. Mixing vanes are intended to disturb fluid flow, i.e., cause a swirling action to improve heat transfer and reduce the potential for hot spot temperatures at the fuel rods.

During individual fuel rod removal and reassembly, e.g., at scheduled maintenance, the mixing vanes can be damaged, i.e., bent. A bent mixing vane interferes with normal fuel rod reinsertion, i.e., exerts bending moment on the fuel rod, thus causing the fuel rod to deflect and bow out of its intended path. Deflection causes the fuel rod to "hang-up" on the first grid below the grid with the bent mixing vane.

If a fuel rod is hung up, it has been usual practice to remove the fuel rod and not to replace it. As a result, a void is left where fluid can leak through. The performance of the fuel assembly is degraded as a result of deleting one or a plurality of fuel rods which cannot be reinserted.

In light of the above, a method for straightening bent mixing vanes is desired so that fuel rods can be reliably reinserted.

SUMMARY OF THE INVENTION

Accordingly, it is an object of the present invention to provide a nuclear reactor fuel assembly mixing vane repair method which is capable of straightening bent mixing vanes efficiently and quickly, without having to dismantle the nuclear reactor and without having to introduce a man in the area of the bent mixing vane.

It is another object of the present invention to provide a nuclear reactor fuel assembly mixing vane repair method which causes little interruption of nuclear reactor scheduled maintenance, is relatively simple in construction and steps, respectively, and does not significantly increase costs related to nuclear reactor operation or maintenance.

To achieve the foregoing and other objects of the present invention, and in accordance with the purpose of the invention, there is provided herein a nuclear reactor fuel assembly mixing vane repair method preferably using a unique tool and a related tool handling device. The tool is made up of an elongated tube with a housing containing two sets of high-strength blades remotely movable between closed and opened positions. The tool is inserted into a fuel cell detected as having a grid with a bent mixing vane therein via the tool handling device to a location below the damaged grid with the blades in the closed position. The blades are then remotely opened via a cable and rod combination within the apparatus, and the tool is withdrawn. As the tool is withdrawn, a blade abuts the bent mixing vane and bends it back close to its original position. After straightening of the bent mixing vane, the blades are closed and the tool is fully extracted from the fuel cell. Once the tool is fully extracted, the fuel rod can again be reliably inserted into the repaired fuel cell.

The method includes the steps of: introducing the apparatus with the blades closed below the damaged grid; opening the blades as the apparatus is withdrawn to abut and straighten the bent mixing vane; closing the blades; and fully extracting the apparatus from the fuel cell.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a side, cross-sectional view of a portion of the mixing vane repair apparatus which can be used with the present method invention, illustrating particularly orientation of the movable blades within the tool thereof.

FIG. 5 is a front, cross-sectional view of the mixing vane repair apparatus according to the present invention taken along line 5—5 of FIG. 4;

FIG. 7 is a side, cross-sectional view of a portion of the tool shown in FIG. 4, with the blades deleted;

DETAILED DESCRIPTION OF THE PREFERRED EMBODIMENTS

Figure 1:
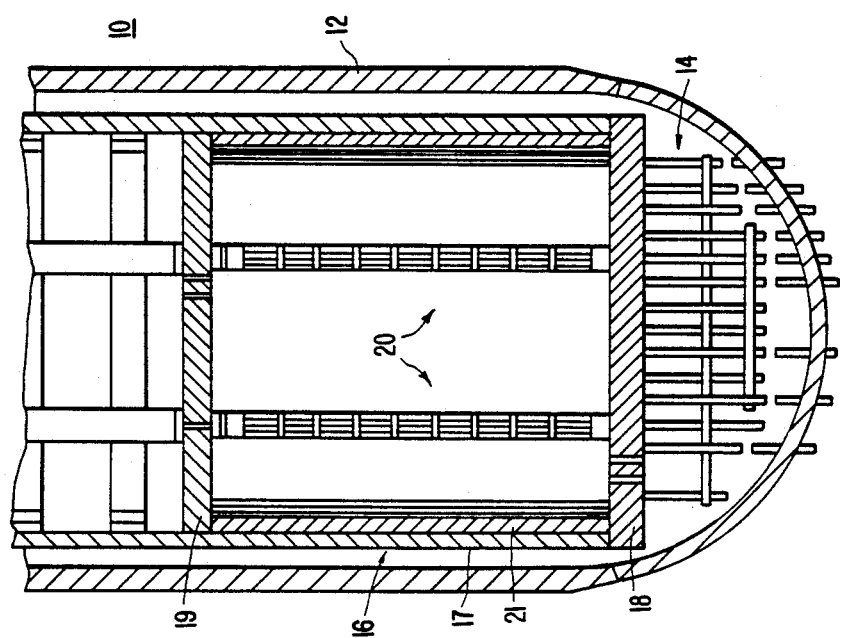
FIG. 1 is a partial, cross-sectional view of a typical nuclear reactor, illustrating particularly the fuel assembly.

FIG. 1 is a partial, cross-sectional view of a portion of a conventional nuclear, pressurized-water reactor 10, including a vessel 12 enclosing so-called bottom mounted instrumentation 14 (illustrated schematically), and a lower barrel assembly 16. The lower barrel assembly 16 includes a generally cylindrical side wall 17 affixed at its lower and upper ends to respective lower and upper core plates 18 and 19. Fuel assemblies 20 are positioned in vertically oriented, parallel axial relationship within the lower barrel assembly 16. A radiation reflection shield 21 is also mounted interiorly of the cylindrical side walls 17.

Figure 2:
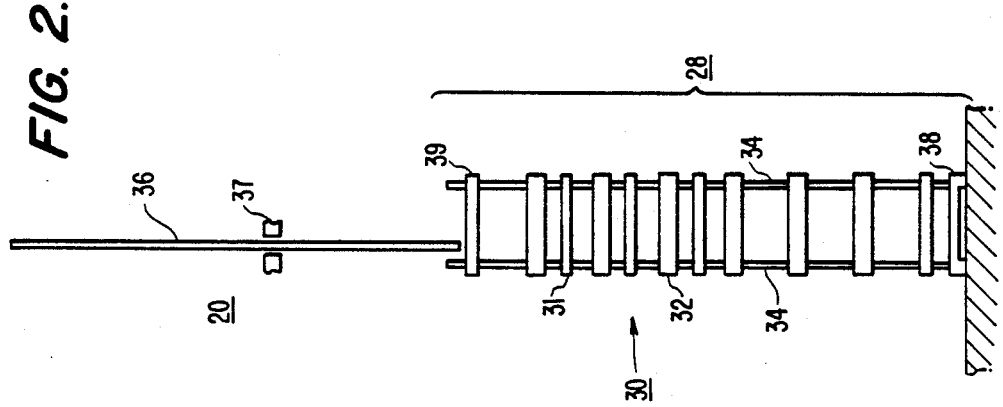
FIG. 2 is a schematic, elevational view of a fuel assembly, illustrating particularly orientation of the various grids thereof and representative insertion of a fuel rod.

One fuel assembly 20 of FIG. 1 is shown in greater detail in FIG. 2. The fuel assembly 20 includes a skeleton 28 made up of parallel grids 30, including relatively thin grids 31 and relatively thick grids 32. The height of each relatively thin grid 31 is approximately 0.56 inches, whereas the height of each relatively thick grid 32 is approximately 2½ to 3 inches.

Figure 3:
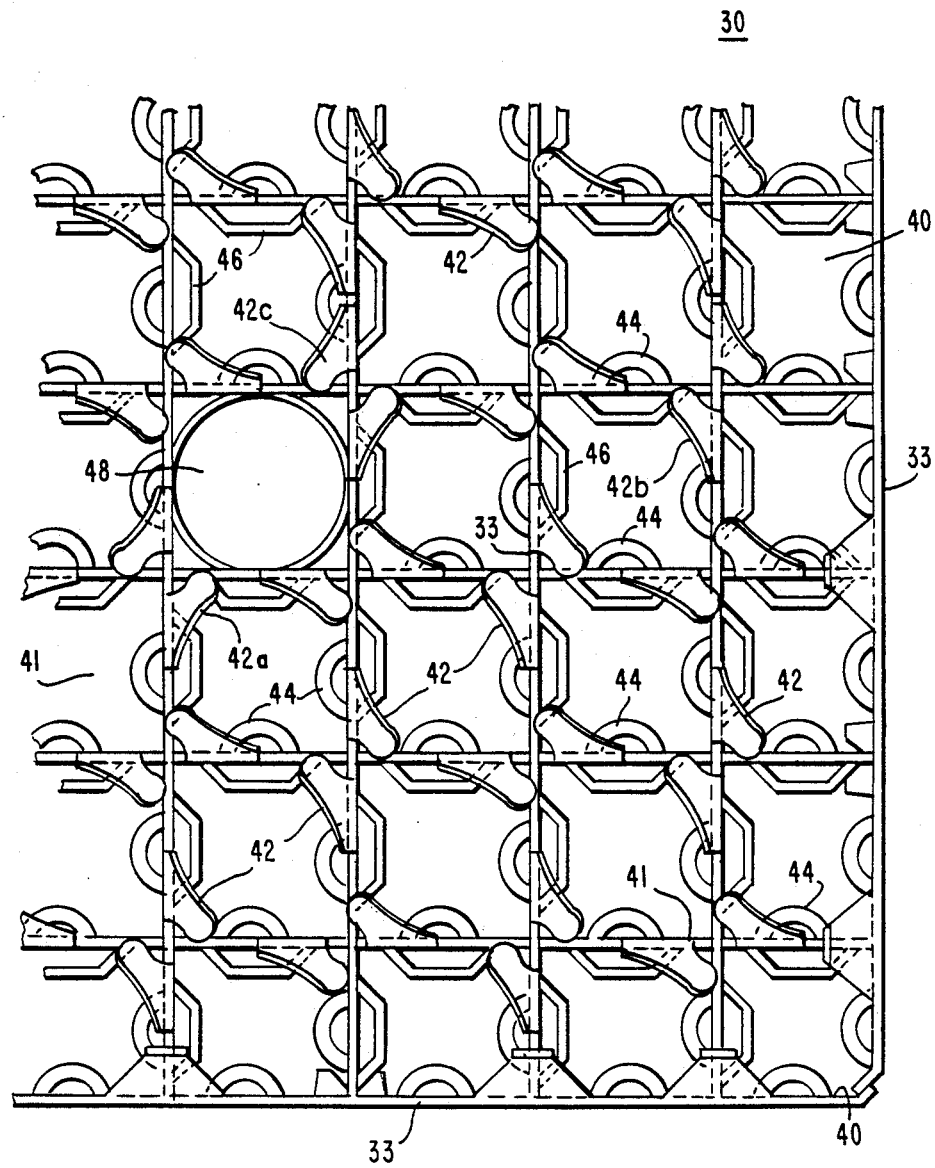
FIG. 3 is a top, plan view of a conventional grid, illustrating particularly individual fuel cells, each having mixing vanes, springs and/or dimples.

As stated above, each grid 30 is made up of a lattice of straps 33 oriented perpendicularly to each other (see FIG. 3). The grids 30 are connected to vertical supports or thimble tubes 34. The skeleton 28 is terminated by a bottom nozzle 38 and a top nozzle 39. As also shown in FIG. 2, a fuel rod 36 can be introduced from the top of the skeleton 28 via a conventional rod handling means 37 and inserted sequentially through the grids 30. The outer diameter of a fuel rod 36 may be, e.g., 0.36 inch.

One grid 30 of FIG. 2 is shown in greater detail in FIG. 3. The grid 30 basically includes a plurality of external fuel cells 40 and a plurality of internal fuel cells 41. In addition, thimble tube openings 48 are formed for receiving the thimble tubes 34 shown in FIG. 2. Each fuel cell 40, 41 includes at least one mixing vane 42 positioned at the corners thereof. Each mixing vane 42 is located at the top of the grid strap 33.

In each fuel cell 40, 41, different combinations of mixing vanes, springs and/or dimples are used. That is, references numeral 42a indicates the first case where a mixing vane 42 which is damaged, i.e., bent, is located opposite two springs 44. Reference numeral 42b indicates the second case where a bent mixing vane 42 is located opposite a spring 44 and a dimple 46. Finally, reference numeral 42c indicates the third case where a bent mixing vane 42 is located opposite two dimples 46.

A damaged mixing vane 42 in one grid 30 produces lateral forces which can skew a fuel rod 36 and result in hang-up at the next lower grid 30 during fuel rod 36 reinsertion. Tests have indicated that fuel rod 36 hang up usually does not occur with either the first or second cases discussed above, i.e., 42a or 42b, but occurs most often in the third case, i.e., 42c, when the damaged mixing vane 42 is located opposite two dimples 46.

The object of the present invention is to repair or reform any bent mixing vanes 42 in the internal or external fuel cells 40, 41 which might cause a fuel rod 36 to hang up during reinsertion. The present invention satisfies this object by providing a method preferably using a mixing vane repair apparatus 49, including a unique tool 50 having movable blades 52, 54, 56 and 58 and a related tool handling device 51 for operating the tool 50 within the fuel cell 40, 41.

More particularly, FIG. 4 is a partial cross-sectional view of the tool 50. The tool 50 is shown only with blades 52 and 56, both in the closed (inactive) position by solid lines and in the open (active) position by phantom lines. However, as shown in the front, cross-sectional view of the tool 50 in FIG. 5, the present invention actually includes four opposing blades 52, 54, 56 and 58, which are described in detail below.

As shown in FIGS. 4 and 7, the tool 50 comprises a tube 60, preferably a 5/16 inch diameter by approximately twelve foot heavy walled, stainless steel tube, including first through fourth sections 60a, 60b, 60c and 60d, respectively. Sections 60a and 60c include adjacent threaded ends 61 and 63, respectively, which are connected via an internally threaded connector 65. The fourth section 60d which is a bottom end cap 90 includes an internally threaded portion 92 therein for receiving a corresponding externally threaded portion 86 formed on the opposite end of the third section 60c.

Sections 60a and 60b of the tool 50 contain an activating rod 62, preferably a 0.093 inch diameter stainless steel rod with brazed on brass bearings 64, spread about two feet apart to prevent buckling. The 5/16 diameter of the tube 60 is sufficiently smaller than the exemplary 0.36 inch diameter fuel rod 36 to permit easy insertion of the tool 50 into a fuel cell 40, 41 below a grid 30 which includes a bent mixing vane 42. As would be understood by an ordinarily skilled person in this art, in order to practice the present invention with fuel rods 36 having larger or smaller outer diameters than the example given, the blades 52, 54, 56 and 58 and tube 60 sizes would be proportionately modified.

The activating rod 62 contacts a smaller rod 66, preferably 0.06 inch×3.75 inch, located in section 60c which is threaded through two rectangular blocks 68 and 70, each having similar construction. For example, each block 68, 70 contains two small dowel pins 72 and 74 that slide in slots 76 and 78, respectively, of overlapping blades 52, 56. The block 70 similarly receives blades 54 and 58. Each blade 52, 54, 56, 58 is oriented 90° relative to adjacent blades.

When the smaller, threaded rod 66 is depressed, as described below, compressing a spring 80, both rectangular blocks 68 and 70 move downward 0.06 inches thereby causing the four blades 52, 54, 56 and 58 to swing out of their housing 82, into the open (active) position as shown in FIG. 4. The center of gravity of each blade 52, 54, 56 and 58 is outboard of the pins 72 and 74, thus producing a torque which assists the opening force produced by the rectangular blocks 68 and 70. On the other hand, in the closed position shown in FIG. 4, the blades 52, 54, 56 and 58 are completely retracted into the housing 82 so that the tool 50 can be inserted past a grid 30 with a damaged mixing vane 42 and opened therebelow, as also described hereafter.

The geometry of the blades 52, 54, 56 and 58 is such that each can only enter the diagonal corners of the fuel cell 40, 41. Therefore, once in a fuel cell 40, 41, the blades 52, 54, 56 and 58 do not contact the springs 44 or dimples 46 shown in FIG. 3. Further each blade 52, 54, 56 and 58 preferably has an approximate 0.39±0.02 inch vertical height on the outside thereof which is necessary so that opposite blades can maintain alignment and contact with the mixing vane 42 and the grid strap 33 as the mixing vane 42 is re-bent to its original unbent (or slightly higher) position.

The blades 52, 54, 56 and 58 should be hinged overlapping pairs rather than individual blades one above the other. The latter construction would be simpler, but the former construction is required due to the short vertical height, e.g., 0.56 inches, of the relatively thin grids 31. That is, in grid 31, the blades 52, 54, 56 and 58 have to occupy the same axial position in order to contact the grid strap 33 and mixing vane 42 simultaneously. If, for example, one blade 52 contacts the mixing vane 42 and the opposite blade 56 is not in position to carry the reaction force, the 5/16 inch diameter tube 60 would carry some of the force and would deflect excessively. As a result, the mixing vane 42 would not be properly straightened. Accordingly, overlapping blade pairs 52, 56 and 54, 58 are preferred when the grids 30 are relatively thin.

As best shown in FIGS. 4 and 7-9, blades 52, 54, 56 and 58 are secured in the housing 82 by means of the two dowel pins 72 and 74. These pins 72, 74 serve as common stabilizing pivots and carry only a small part of the mixing vane 42 straightening force. Upper pins 73 and 75 are located in respective blade cam slots 87 and 88, each having a locking groove 77 that locks the blades 52, 54, 56 and 58 in the open (active) position shown in FIG. 4. When the downward force is removed from the threaded rod 66, the spring 80 pulls the rod 66 upward, kicking the blades 52, 54, 56 and 58 out of the locking groove 77 and rotating them into the housing 82. Finally, lower pins 79 and 81 are received by openings 83 and 85, respectively, and further aid the pivoting motion of the blades.

If the blades 52, 54, 56 and 58 are inadvertently left open as the tool 50 is lowered past the grids 30, a taper 84 of preferably 15° provided on each blade 52, 54, 56 and 58, generates a force which lifts the blades and disengages the locking groove 77. This causes the blades to swing inward, thus minimizing the force exerted on the grid 30.

Figure 6:
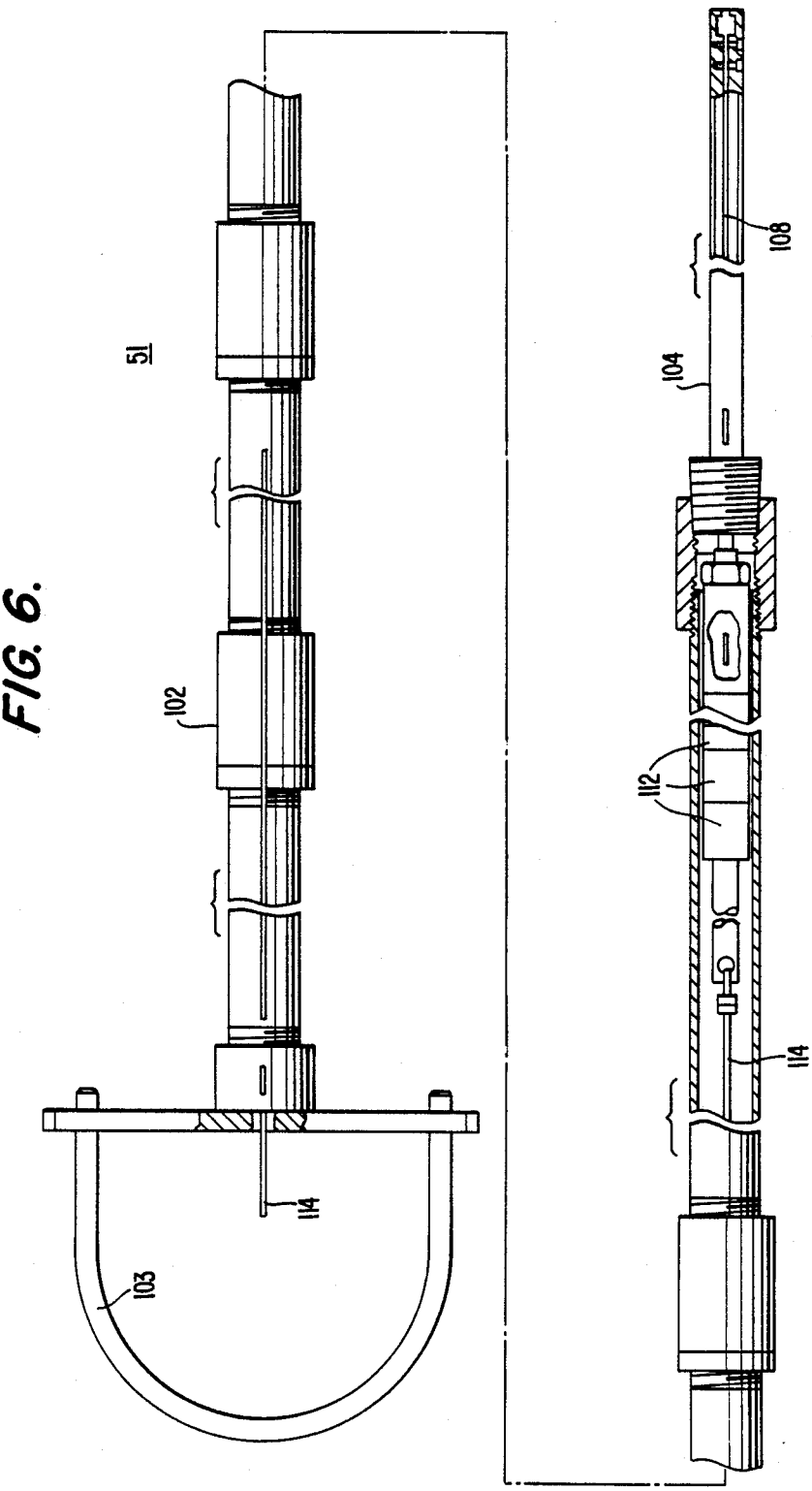
FIG. 6 is a side, partial cross-sectional view of a portion of the mixing vane repair apparatus according to the present invention, illustrating particularly the tool handling device thereof.
Figure 9:
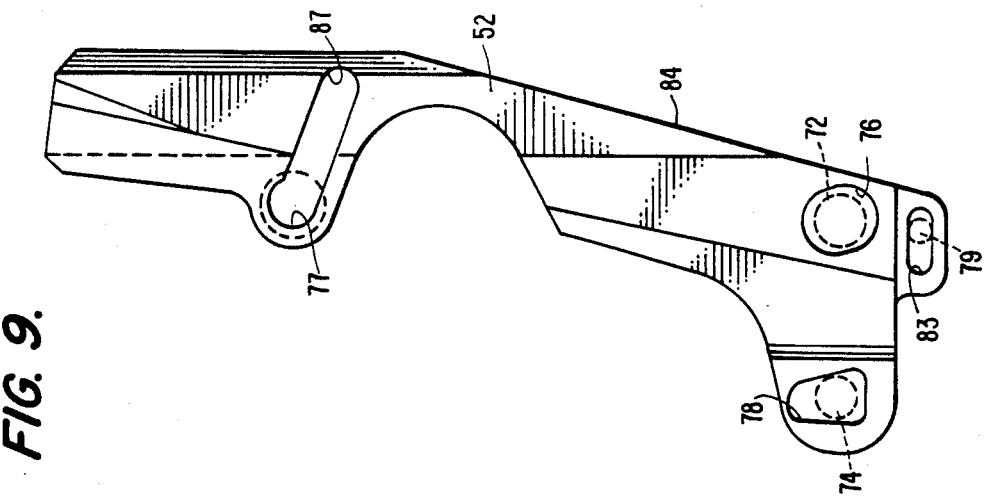
FIG. 9 is a side, elevational view of another blade of a pair used with the tool according to the present invention.
Figure 8:
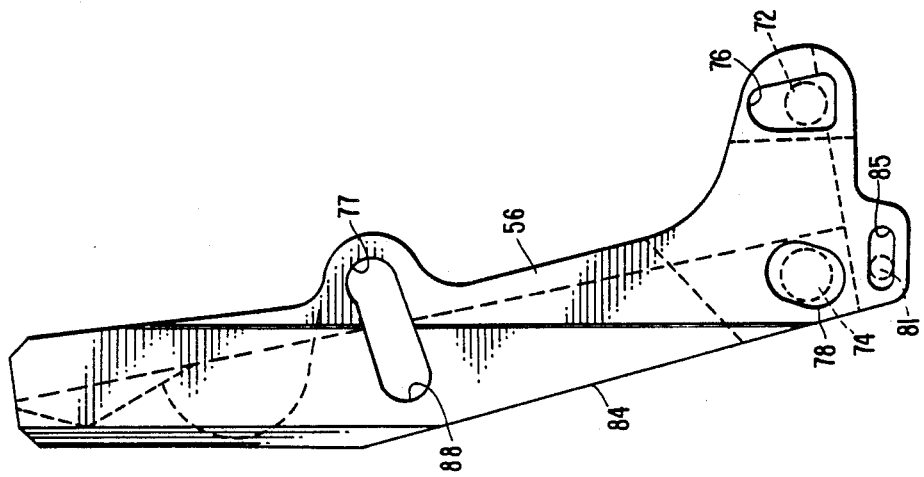
FIG. 8 is a side, elevational view of one blade of a pair used with the tool according to the present invention.

FIG. 6 shows the tool handling device 51 to be used with the tool 50. The device 51 preferably comprises an attachment 103, a conduit 102 (preferably thirty feet of one-inch aluminum) and a collet 104. The collet 104 clamps to the end plug 106 of the tool 50 shown in FIG. 4. The end plug 106 is standard so that the tool can also be handled by any of the conventionally used fuel rod manipulation tools, manual or motorized. A pushrod 108, preferably 0.06 inches in diameter, passes through the collet 104 and contacts the activating rod 62 of the tool 50 shown in FIG. 4.

The means for moving the blades 52, 54, 56 and 58 between the opened and closed positions includes the 0.06 diameter pushrod 108 connected to a plurality of brass weights 112. The weights 112 are lifted by the operator remotely pulling a stainless steel cable 114 running through the tool handling device 51.

Figure 10:
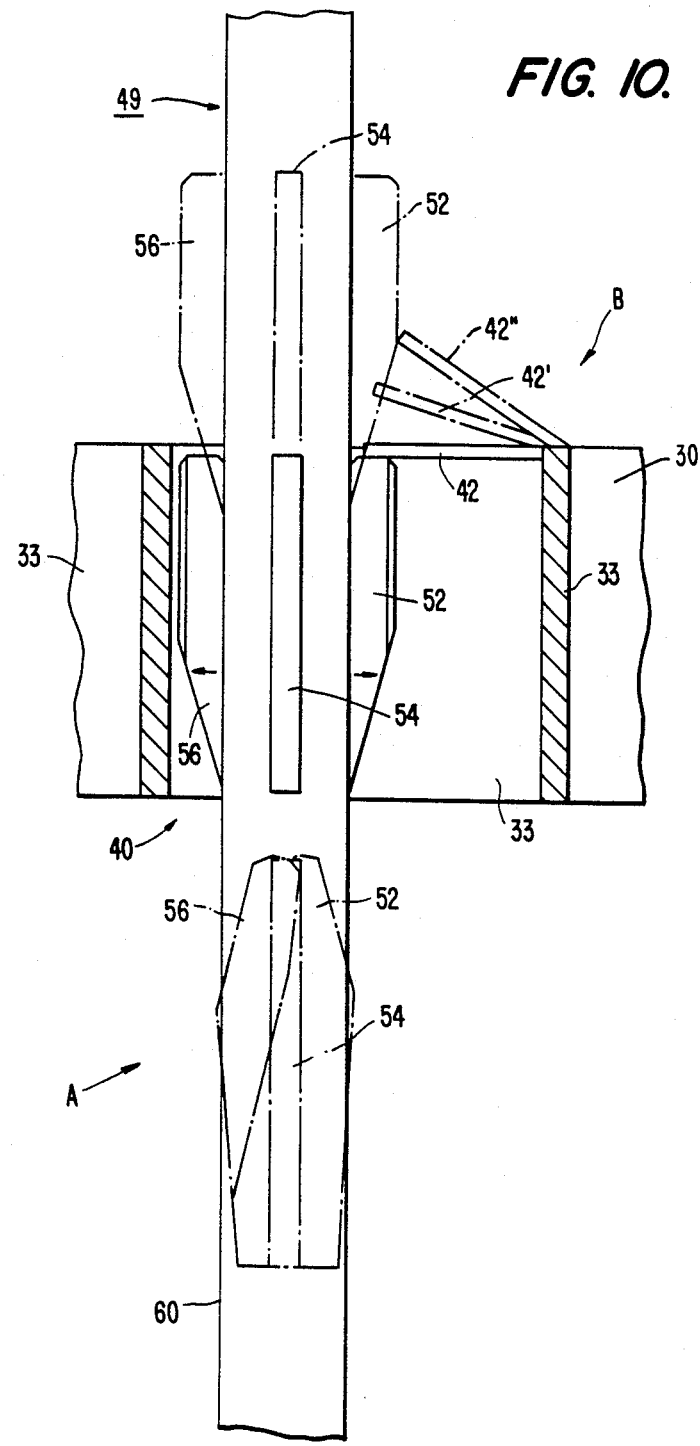
FIG. 10 is a side view of the mixing vane repair apparatus according to the present invention during use.

The method according to the present invention will now be described in greater detail with reference to FIGS. 2, 4 and 10.

Confirmation that a bent mixing vane 42 exists can first be obtained by measuring excessive fuel rod 36 insertion force (force limit trip), removing the fuel rod and then observing the condition of the mixing vane(s) 42 using a conventional quartz fiberscope connected to a TV system (not shown). Once there is verification that a fuel rod 36 cannot be inserted into the fuel cell inspected due to a bent mixing vane(s) 42, the tool 50 is attached to the tool handling device 51 to form the mixing vane repair apparatus 49 according to the present invention. Then a stationary pointer may be clamped to some convenient point on the bridge railing (not shown) of the nuclear reactor and is used as a reference, e.g., against marks made on the tool handling device 51. This keeps the blades 52, 54, 56 and 58 of the tool 50 properly aligned with respect to the grids 30.

The apparatus 49 is then introduced with the blades 52, 54, 56 and 58 in the closed position into, e.g., the fuel cell 41 to a point just below a grid including the bent mixing vane 42, as shown by "A" in FIG. 10.

With the blades 52, 54, 56 and 58 still closed, the apparatus 49 is raised until the blades are slightly above the bottom of the damaged grid 30. The blades 52, 54, 56 and 58 are then opened by releasing the pulled cable 114, as described above. When the blades open, each is positioned in a corner of the fuel cell 41. A blade, e.g., 52, is now directly under the bent mixing vane 42. As the apparatus 49 is slowly raised upward, load is monitored. The load is increased to twenty-five to thirty pounds as the damaged mixing vane(s) 42 is contacted by the blade 52. This load is maintained as the mixing vane is moved through the intermediate position 42' and until it becomes a "straightened" or re-bent mixing vane 42", as shown by "B" in FIG. 10. As described, one blade, e.g., 52, of a pair performs the straightening while the other blade 56 of the pair carries the reaction load over to the grid strap 33. As the tool 50 is withdrawn upward, the pointer on the spent fuel pit bridge rail enables the operator to maintain orientation of the blades 52, 54, 56 and 58 relative to the chosen grid 30. The tool 50 is raised until a 30 pound load limit is reached, at which time the mixing vane should be straightened.

In regard to external fuel cells 40, an extra step is required at this time. That is, the load on the apparatus 49 is reduced to static weight by lowering the apparatus 49 approximately ½ inch, and the blades 52, 54, 56 and 58 are allowed to close.

The apparatus 49 is then raised until blades 52, 54, 56 and 58 clear the grid 30. As the apparatus 49 is raised, the blades 52, 54, 56 and 58 should be in the closed position when passing any other grids 30 and the apparatus 49 is fully extracted from the fuel cell 41.

Then, the fiberscope is used again to inspect the condition of all straightened mixing vanes 42" and verify that the fuel rods 36 can be re-inserted into the fuel cell 40, 41 locations that now have repaired (straightened) mixing vanes 42".

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims and their equivalents.

I claim:

1. A method for straightening a bent mixing vane of a grid in a fuel cell of a nuclear reactor, comprising:
   (a) introducing a member having means movable between a first open position and a second closed position, into the fuel cell with the means in the second closed position and being below the grid with the bent mixing vane;
   (b) moving the means into the first open position; and
   (c) partially withdrawing the member axially from the fuel cell such that the means contacts and straightens the bent mixing vane and carries a reaction load to the grid.

2. The method as recited in claim 1, wherein step (a) is preceded by the step of remotely detecting that the mixing vane is bent.

3. The method as recited in claim 1, wherein step (c) is followed by the step of:
   (d) moving the means into the second closed position.

4. The method as recited in claim 3, wherein step (d) is followed by the step of:

(e) extracting the member from the fuel cell.

5. The method as recited in claim 4, wherein step (e) is followed by the step of:
(f) detecting that the mixing vane is straightened.

6. A method for straightening a bent mixing vane of a grid in a fuel cell of a nuclear reactor, comprising:
(a) introducing a member having a first means movable between a first open position and a second closed position, and actuatable second means for moving the first movable means between the first and second positions, into the fuel cell with the first means in the second closed position and being below the grid with the bent mixing vane;
(b) actuating the second means to move the first means into the first open position; and
(c) partially withdrawing the member axially from the fuel cell such that the first means contacts and straightens the bent mixing vane and carries a reaction load to the grid.

7. The method as recited in claim 6, wherein step (c) is followed by the step of:
(d) actuating the second means to move the first means into the second closed position.

8. The method as recited in claim 7, wherein step (d) is followed by the step of:
(e) extracting the member from the fuel cell.

9. The method as recited in claim 8, wherein step (e) is followed by the step of:
(f) remotely detecting that the mixing vane is straightened.

10. The method as recited in claim 6, wherein step (a) is preceded by the step of remotely detecting that the mixing vane is bent.

11. A method for straightening a bent mixing vane of a grid in a fuel cell of a nuclear reactor, comprising:
(a) remotely detecting that the mixing vane is bent;
(b) introducing a member having a means movable between a first open position and a second closed position, and actuatable second means for moving the first movable means between the first and second positions, into the fuel cell with the first means in the second closed position and being below the grid with the bent mixing vane;
(c) actuating the second means to move the first means into the first open position; and
(d) partially withdrawing the member from the fuel cell such that the first means contacts and straightens the bent mixing vane, wherein the step of remotely detecting includes the substeps of:
 (i) measuring excessive fuel rod insertion force,
 (ii) removing the fuel rod, and
 (iii) remotely observing the condition of the mixing vane.

12. A method for straightening a bent mixing vane of a grid in a fuel cell of a nuclear reactor, comprising:
(a) introducing a member having means movable between a first open position and a second closed position, and actuatable second means for moving the first movable means between the first and second positions, into the fuel cell with the first means in the second closed position and being below the grid with the bent mixing vane;
(b) actuating the second means to move the first means into the first open position;
(c) partially withdrawing the member from the fuel cell such that the first means contacts and straightens the bent mixing vane; and
(d) monitoring and raising load on the member, wherein steps (c) and (d) are performed contemporaneously.

13. A method for straightening a bent mixing vane of a grid in an external fuel cell of a nuclear reactor, comprising:
(a) introducing a member having means movable between a first open position and a second closed position, into the external fuel cell with the means in the second closed position and being below the grid with the bent mixing vane;
(b) moving the means into the first open position;
(c) partially withdrawing the member from the grid while monitoring and raising load on the member such that the means contacts and straightens the bent mixing vane;
(d) reducing the load on the member to static weight thereof;
(e) slightly lowering the member;
(f) moving the means into the second closed position; and
(g) extracting the member from the fuel cell.

* * * * *